(12) United States Patent
Deguchi et al.

(10) Patent No.: US 8,792,837 B2
(45) Date of Patent: Jul. 29, 2014

(54) TRANSMISSION/RECEPTION ANTENNA AND TRANSMISSION/RECEPTION DEVICE USING SAME

(75) Inventors: Futoshi Deguchi, Fukuoka (JP);
Youichirou Honda, Miyazaki (JP);
Yoshinori Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 13/372,168

(22) Filed: Feb. 13, 2012

(65) Prior Publication Data
US 2012/0208474 A1  Aug. 16, 2012

(30) Foreign Application Priority Data

Feb. 15, 2011  (JP) ................................ 2011-029853

(51) Int. Cl.
*H04B 1/44* (2006.01)
(52) U.S. Cl.
USPC ......... 455/78; 455/60.2; 455/550.1; 343/788; 343/855
(58) Field of Classification Search
CPC .................................................... H01Q 1/243
USPC ................. 455/78, 90.2, 550.1, 562.1, 575.7; 343/788, 855
See application file for complete search history.

(56) References Cited

U.S. PATENT DOCUMENTS

| 5,602,556 | A | * | 2/1997 | Bowers | ......................... | 343/742 |
| 7,589,687 | B2 | | 9/2009 | Iwai | | |
| 8,174,454 | B2 | * | 5/2012 | Mayer | ........................... | 343/725 |
| 2006/0012482 | A1 | * | 1/2006 | Zalud et al. | ................. | 340/572.7 |
| 2008/0143613 | A1 | | 6/2008 | Iwai | | |

FOREIGN PATENT DOCUMENTS

| JP | 4-78985 | 3/1992 |
|---|---|---|
| JP | 4-276890 | 10/1992 |
| JP | 11-175669 | 7/1999 |
| JP | 11-258991 | 9/1999 |
| JP | 2000-251032 | 9/2000 |
| JP | 2007-199871 | 8/2007 |
| JP | 2008-167420 | 7/2008 |
| JP | 2008-167421 | 7/2008 |
| JP | 2010-219652 | 9/2010 |

* cited by examiner

*Primary Examiner* — Tuan H Nguyen
(74) *Attorney, Agent, or Firm* — Dickinson Wright PLLC

(57) ABSTRACT

A transmission/reception antenna and a transmission/reception device using the antenna wherein the antenna includes a dielectric base board, an excitation loop antenna provided on the dielectric base board, a transmission/reception loop antenna provided on the dielectric base board in close proximity of but not in contact with the excitation loop antenna, and a resonance capacitor connected between two ends of the transmission/reception loop antenna. A coupling capacitor is connected to one of the two ends of the transmission/reception loop antenna. The excitation loop antenna is connected to a transmitter, and the transmission/reception loop antenna is connected to the receptor via the coupling capacitor. Thereby, the frequency property may be expanded without increasing the power consumption, and the reception processing unit is enabled to properly process the reception signal.

11 Claims, 14 Drawing Sheets

TRANSMISSION/RECEPTION ANTENNA AND TRANSMISSION/RECEPTION DEVICE USING SAME

TECHNICAL FIELD

The present invention relates to a transmission/reception antenna for supplying electric power to wireless communication media such as RFID tags and contactless smart cards and exchanging signals with the wireless communication media, and a transmission/reception device using the same.

BACKGROUND OF THE INVENTION

In recent years, the technology for identifying objects and authenticating individuals has come to be widely used in supply chain and logistics systems, traffic systems, inventory management systems, book management systems, personal verification systems and electronic money systems by using wireless communication media such as RFID tags and contactless smart cards. A system based on wireless communication media uses a transmission/reception device for exchanging signals with the wireless communication media and supplying electric power to the wireless communication media. In such a system, it is advantageous if a single transmission/reception device can communicate with wireless communication media of a number of different kinds.

However, the communication protocol of the wireless communication media may differ from one system to another. Oftentimes, the bandwidth for the communication between the transmission/reception device and the wireless communication media vary from one system to another so that it is desirable for the transmission/reception device to be able to cover a wide frequency range. To meet such a need, it has been proposed to provide a plurality of resistors in the transmission/reception signal path of a transmission/reception antenna and to switch between the resistors so as to expand the frequency range of the transmission/reception device as disclosed in JP 2007-199871.

However, according to this prior art, because the resistors are always present in the transmission/reception signal path of the transmission/reception antenna, some power loss is inevitable, and the power consumption is undesirably great.

Also, if the intensity of the transmission signal that is passed directly to the reception processing unit of the transmission/reception device is greater than that of the normal reception signal, the transmission signal may prevent the processing of the normal reception signal.

BRIEF SUMMARY OF THE INVENTION

In view of such problems of the prior art, a primary object of the present invention is to provide a transmission/reception device that is configured to achieve a wide frequency range, and allow the reception signal processing unit to properly process the reception signal.

To achieve such an object, the present invention provides a transmission/reception antenna, comprising: a dielectric base board; an excitation loop antenna disposed on the dielectric base board; a transmission/reception loop antenna disposed on the dielectric base board in close proximity of but not in contact with the excitation loop antenna; and a resonance capacitor connected between two ends of the transmission/reception loop antenna; wherein a coupling capacitor is connected to one of the two ends of the transmission/reception loop antenna.

According to the present invention, when a transmission signal is forwarded to the excitation loop antenna, the transmission signal is transmitted from the excitation loop antenna to the transmission/reception loop antenna by magnetic induction, and the transmission signal is amplified before being transmitted from the transmission/reception loop antenna. By placing the excitation loop antenna in close proximity of the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

In particular, the directions of the electric current flowing through the excitation loop antenna and the transmission/reception loop antenna are opposite to each other so that the magnetic flux created by the electric current flowing through the excitation loop antenna attenuates the magnetic flux created by the electric current flowing through the transmission/reception loop antenna. However, as the transmission/reception loop antenna has a loop of a plurality of turns while the excitation loop antenna has a loop of only a single turn, the attenuation in the magnetic flux created in the transmission/reception loop antenna can be controlled. Thereby, a transmission signal of an adequate power can be transmitted from the transmission/reception loop antenna without increasing the transmission power of the excitation loop antenna, and the consumption of power can be minimized.

According to the transmission/reception antenna of the present invention, a wide frequency property can be achieved while the power consumption is minimized. In particular, according to the present invention, by appropriately setting the coupling coefficient between the excitation loop antenna and the transmission/reception loop antenna, the frequency property can be expanded. Furthermore, as the expansion of the frequency property can be achieved without placing a resistor in the transmission/reception signal path of the transmission/reception antenna, the power consumption can be kept low.

Furthermore, when the excitation loop antenna comprises a loop portion of a single turn, and the transmission/reception loop antenna comprises a loop portion of a plurality of turns, the power consumption can be particularly reduced. In particular, the directions of the electric current flowing through the excitation loop antenna and the transmission/reception loop antenna are opposite to each other so that the magnetic flux created by the electric current flowing through the excitation loop antenna attenuates the magnetic flux created by the electric current flowing through the transmission/reception loop antenna. Therefore, when the excitation loop antenna comprises a loop portion of only a single turn, the reduction in the magnetic flux of the transmission/reception loop antenna can be controlled. As a result, even without increasing the power of the transmission from the excitation loop antenna, an adequate magnetic flux can be produced from the transmission/reception loop antenna, and this contributes to the reduction in the power consumption.

If the transmission/reception loop antenna were not connected to the reception processing unit via the coupling capacitor, a large difference would be produced between the signal intensities of the transmission signal and the reception signal, causing the intensity of the transmission signal that is passed directly from the transmission/reception loop antenna to the reception processing unit to be greater than the reception signal. This would cause the transmission signal to interfere with the processing of the reception signal.

Based on such a consideration, according to the present invention, a coupling capacitor is connected to one of the two ends of the transmission/reception loop antenna so that an external connecting terminal that may be connected to an external circuit may be connected to the other end of the coupling capacitor. When a reception processing unit is connected to the external connecting terminal, the transmission/reception loop antenna is connected to the reception processing via the coupling capacitor. Thereby, the intensity of the transmission signal that is passed directly from the transmission/reception loop antenna to the reception processing unit can be minimized so that the interference between the transmission signal and the reception signal can be minimized, and the reception processing unit is enabled to process the reception signal in a normal and appropriate manner.

The transmission/reception device of the present invention comprises such a transmission/reception antenna; a transmission processing unit for forwarding a transmission signal to the transmission/reception antenna; a reception processing unit for receiving a reception signal from the transmission/reception antenna; and a control unit for controlling the transmission processing unit and the reception processing unit. Therefore, for the reasons discussed above, the expansion of the frequency property and the reduction in the power consumption can be achieved at the same time. Furthermore, the reception processing unit is enabled to process the reception signal in a normal and appropriate manner.

As discussed above, the transmission/reception antenna and the transmission/reception device of the present invention can expand the frequency property without increasing the power consumption, and are highly useful as a transmission/reception antenna and a transmission/reception device for supplying electric power to wireless communication media such as RFID tags and contactless smart cards and exchanging signals with the wireless communication media.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
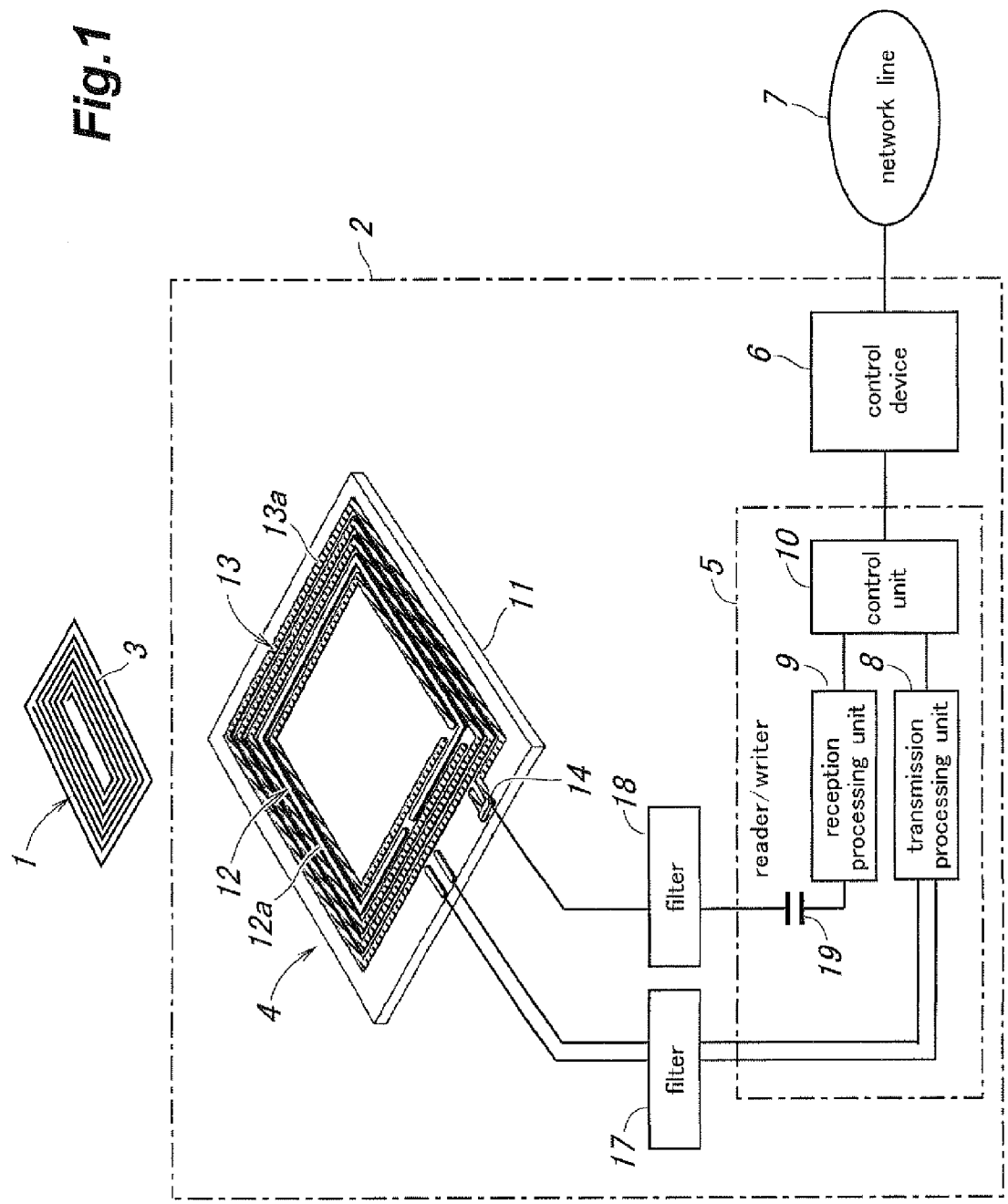
FIG. 1 is a block diagram showing a transmission/reception system incorporated with a transmission/reception device given as a first embodiment of the present invention.

According to a first aspect of the present invention, in order to achieve the object mentioned above, the present invention provides a transmission/reception antenna, comprising: a dielectric base board; an excitation loop antenna disposed on the dielectric base board; a transmission/reception loop antenna disposed on the dielectric base board in close proximity of but not in contact with the excitation loop antenna; and a resonance capacitor connected between two ends of the transmission/reception loop antenna; wherein a coupling capacitor is connected to one of the two ends of the transmission/reception loop antenna.

According to this aspect of the present invention, when a transmission signal is forwarded to the excitation loop antenna, the transmission signal is transmitted from the excitation loop antenna to the transmission/reception loop antenna by magnetic induction, and the transmission signal is amplified before being transmitted to the transmission/reception loop antenna. By placing the excitation loop antenna in close proximity of the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

In such an arrangement, when the excitation loop antenna and the transmission/reception loop antenna are placed in close proximity of each other, the transmission signal could be transmitted from the excitation loop antenna to the transmission/reception loop antenna in an amplified manner, and this may cause the reception signal to be directly passed to the reception processing unit, thereby preventing the reception processing unit from properly processing the reception signal. However, by connecting the transmission/reception loop antenna with the reception processing unit via the coupling capacitor, the intensity of the transmission signal that is passed directly to the reception processing unit is reduced so that the reception processing unit is enabled to properly process the reception signal.

According to a second aspect of the present invention, in the arrangement based on the first aspect of the present invention, the excitation loop antenna comprises a loop portion of a single turn, and the transmission/reception loop antenna comprises a loop portion of a plurality of turns.

According to this arrangement, when the directions of the electric current flowing through the excitation loop antenna and the transmission/reception loop antenna are opposite to each other, the magnetic flux created by the electric current flowing through the excitation loop antenna attenuates the magnetic flux created by the electric current flowing through the transmission/reception loop antenna. However, as the transmission/reception loop antenna has a loop of a plurality of turns while the excitation loop antenna has a loop of only a single turn, the attenuation in the magnetic flux created in the transmission/reception loop antenna can be controlled. Thereby, a transmission signal of an adequate power can be obtained from the transmission/reception loop antenna without increasing the transmission power of the excitation loop antenna, and the consumption of power can be minimized.

According to a third aspect of the present invention, in the arrangement based on the first aspect of the present invention, a coupling coefficient K between the excitation loop antenna and the transmission/reception loop antenna is in a rage of 0.5 to 0.7.

Thereby, a high overall communication performance combining a high transmission performance and a high reception performance can be achieved.

According to a fourth aspect of the present invention, in the arrangement based on the first aspect of the present invention, the transmission/reception loop antenna comprises an inner loop portion and an outer loop portion located outside of the inner loop portion, and the excitation loop antenna is located between the inner loop portion and the outer loop portion of the transmission/reception loop antenna.

Thereby, the coupling coefficient K between the excitation loop antenna and the transmission/reception loop antenna can be made a relatively high value such as 0.7 so that the frequency property can be expanded.

According to a fifth aspect of the present invention, in the arrangement based on the first aspect of the present invention, the excitation loop antenna is located inside of the transmission/reception loop antenna.

Thereby, the coupling coefficient K between the excitation loop antenna and the transmission/reception loop antenna can be made a relatively high value such as 0.5 so that the frequency property can be expanded.

According to a sixth aspect of the present invention, in the arrangement based on the first aspect of the present invention, the excitation loop antenna is located outside of the transmission/reception loop antenna.

Thereby, the coupling coefficient K between the excitation loop antenna and the transmission/reception loop antenna can be made a relatively high value such as 0.5 so that the frequency property can be expanded.

The present invention also provides a transmission/reception device equipped with a transmission/reception antenna according to any of the foregoing structures, the transmission/reception device further comprising a transmission processing unit for forwarding a transmission signal to the transmission/reception antenna; a reception processing unit for receiving a reception signal from the transmission/reception antenna; and a control unit for controlling the transmission processing unit and the reception processing unit; wherein the excitation loop antenna is connected to the transmission processing unit, and the transmission/reception loop antenna is connected to the reception processing unit via the coupling capacitor.

Alternatively, the present invention may provide a transmission/reception device equipped with a transmission/reception antenna according to any of the foregoing structures, the transmission/reception device further comprising a transmission processing unit for forwarding a transmission signal to the transmission/reception antenna; a reception processing unit for receiving a reception signal from the transmission/reception antenna; a control unit for controlling the transmission processing unit and the reception processing unit; a transmission processing unit connecting terminal connected to the excitation loop antenna; and a reception processing unit connecting terminal connected to the transmission/reception loop antenna; wherein the transmission processing unit connecting terminal connected to the excitation loop antenna is connected to the transmission processing unit, and the reception processing unit connecting terminal is connected to the reception processing unit via the coupling capacitor.

Thereby, for the same reasons discussed above, the frequency property can be expanded without increasing the power consumption, and the reception processing unit is enabled to process the reception signal in an appropriate manner. Preferably, the excitation loop antenna comprises a loop portion of a single turn, and the transmission/reception loop antenna comprises a loop portion of a plurality of turns.

A transmission/reception antenna and a transmission/reception device using the same according to the present invention are described in the following with reference to the appended drawings. The embodiments of the present invention described in the following are only exemplary, and are incorporated with various features that are technically desirable but may not be essential for the present invention. Therefore, the scope of the present invention should not be limited by the embodiments described in the following unless specifically defined otherwise. Each of the preferred embodiments is now described in the following with reference to the associated drawings.

Embodiment 1

FIG. 1 shows an overall structure of a transmission/reception system incorporated with a transmission/reception device given as a first embodiment of the present invention. This transmission/reception system can be used in supply chain and logistics systems, traffic systems, inventory management systems, book management systems, personal verification systems, and so on, and comprises a wireless communication medium 1 and a transmission/reception device 2 configured to supply electric power to the wireless communication medium 1 and exchange signals with the wireless communication medium 1.

The wireless communication medium 1 may consist of a RFID tag attached to a piece of merchandise, a contactless smart card for personal verification or any other similar device, and comprises a transmission/reception loop antenna 3 and a control IC (not shown in the drawings) that is connected to the transmission/reception loop antenna 3. The wireless communication medium 1 may communicate with the transmission/reception device 2 by using radio wave in a frequency band of 13.56 MHz.

The transmission/reception device 2 comprises a transmission/reception antenna 4, a reader/writer device 5 connected to the transmission/reception antenna 4 and a control device 6 connected to the reader/writer device 5. The control device 6 is connected to a network line 7. The reader/writer device 5 comprises a transmission processing unit 8 for forwarding a transmission signal to the transmission/reception antenna 4, a reception processing unit 9 for receiving a reception signal from the transmission/reception antenna 4 and a control unit 10 which is in turn connected to the control device 6.

The transmission/reception antenna 4 comprises a dielectric base board 11 and an excitation loop antenna 12 and a transmission/reception loop antenna 13 placed on the dielectric base board 11 in close proximity of each other without touching each other and a resonance capacitor 14 connected across the two ends of the transmission/reception loop antenna 13. The excitation loop antenna 12 and the transmission/reception loop antenna 13 may be printed on the surface of the dielectric base board 11.

The excitation loop antenna 12 is connected to the transmission processing unit 8 of the reader/writer device 5 via a filter circuit 17, and the transmission/reception loop antenna 13 is connected to the reception processing unit 9 of the reader/writer device 5 via a filter circuit 18.

In this transmission/reception device 2, a coupling capacitor 19 is provided in a reception signal path for conducting the signal received by the transmission/reception loop antenna 13 to the reception processing unit 9. More specifically, in the illustrated embodiment, the coupling capacitor 19 is connected between the filter circuit 18 and the reception processing unit 9.

In the transmission/reception device 2, the transmission signal from the transmission processing unit 8 is forwarded to the excitation loop antenna 12 via the filter circuit 17, and owing to the magnetic induction caused by the electric current conducted through the excitation loop antenna 12, the transmission signal is transmitted from the excitation loop antenna 12 to the transmission/reception loop antenna 13, and thence to the wireless communication medium 1. The wireless communication medium 1 receives the transmission signal from the transmission/reception loop antenna 13 with the reception loop antenna 3 so that the wireless communication medium 1 receives electric power as well as the signal.

The transmission signal from the wireless communication medium 1 is received by the transmission/reception loop antenna 13, and the received signal is forwarded to the reception processing unit 9 via the filter circuit 18 and the coupling capacitor 19.

Figure 2:
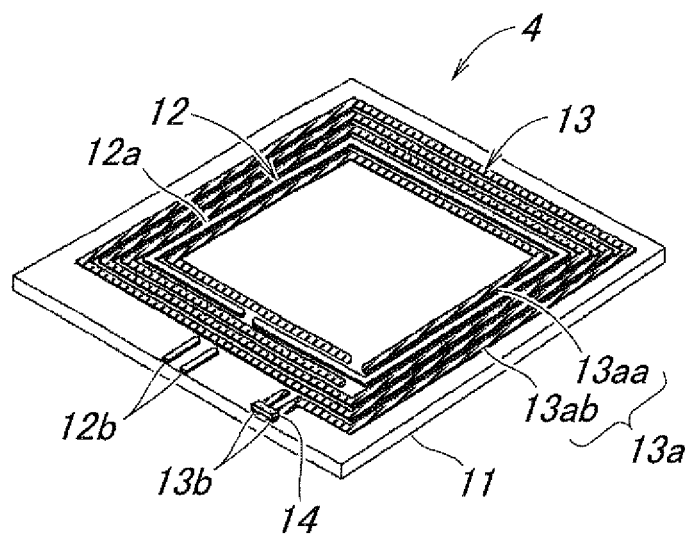
FIG. 2 is a perspective view showing a transmission/reception antenna 4 of the transmission/reception device 2 of the first embodiment of the present invention.
Figure 3:
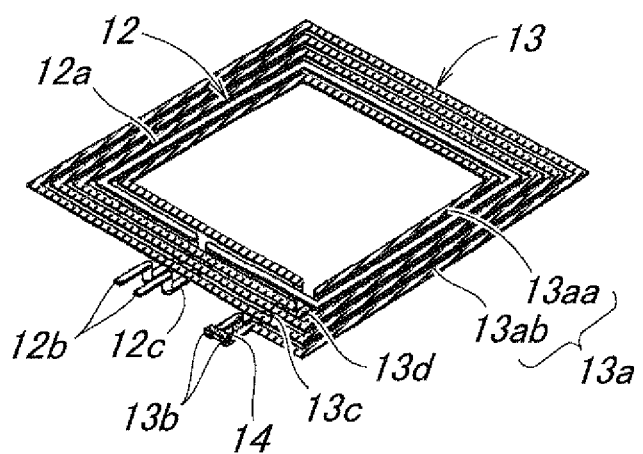
FIG. 3 is a perspective view of an essential part of the transmission/reception antenna 4.
Figure 4:
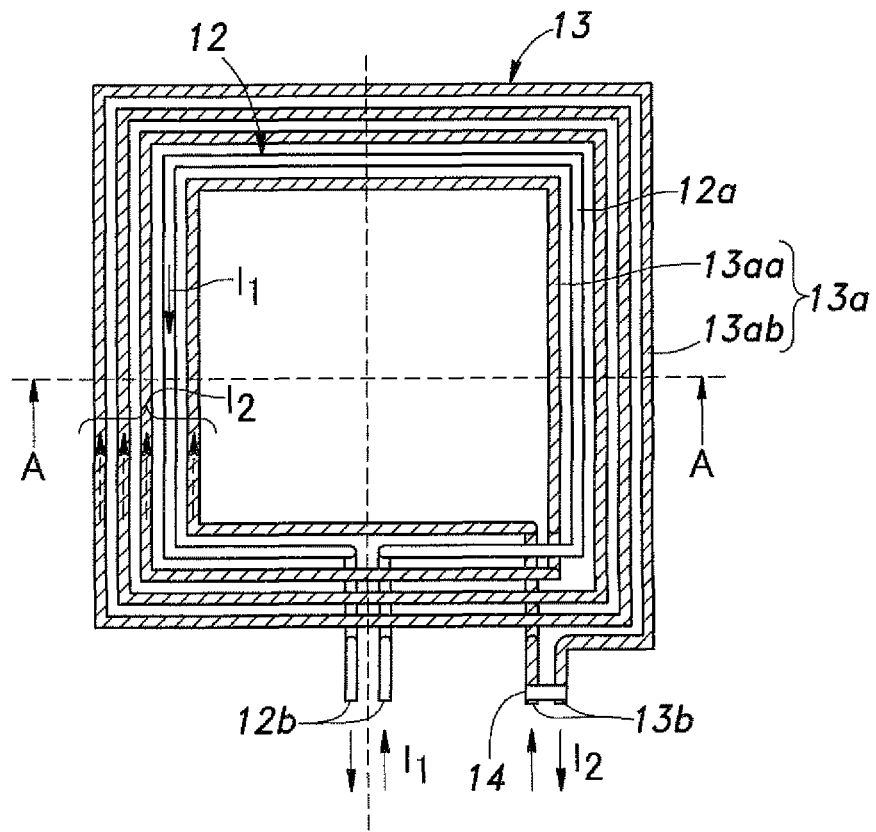
FIG. 4 is a plan view of an essential part of the transmission/reception antenna 4.
Figure 5:
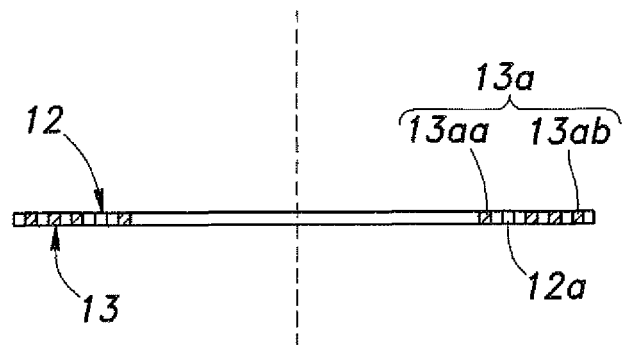
FIG. 5 is a sectional view of an essential part of the transmission/reception antenna 4 taken along line A-A of FIG. 4.

FIG. 2 is a perspective view showing the transmission/reception antenna 4. FIG. 3 is a perspective view of an essential part of the transmission/reception antenna 4. FIG. 4 is a plan view of an essential part of the transmission/reception antenna 4. FIG. 5 is a sectional view of an essential part of the transmission/reception antenna 4 taken along line A-A of FIG. 4. In FIGS. 3 to 5, the dielectric base board 11 is omitted from illustration to clearly show the structures of the excitation loop antenna 12 and the transmission/reception loop antenna 13 and the relationship between them.

As shown in FIGS. 2 to 5, the excitation loop antenna 12 of the transmission/reception antenna 4 comprises a rectangular loop portion 12a of a single turn, and the transmission/reception loop antenna 13 comprises a rectangular loop portion 13a of a plurality (four, in this embodiment) of turns. The excitation loop antenna 12 is located between an inner loop portion 13aa (of a single turn) and an outer loop portion 13ab (of three turns) of the loop portion 13a of the transmission/reception loop antenna 13. Owing to this arrangement, the coupling coefficient K of the electromagnetic coupling caused by the mutual induction between the excitation loop antenna 12 and the transmission/reception loop antenna 13 can be set at a value of approximately 0.7 so that a favorable communication performance can be achieved as will be described hereinafter.

As shown in FIG. 2, terminal ends (connecting terminals) 12b of the excitation loop antenna 12 and terminal ends (connecting terminals) 13b of the transmission/reception loop antenna 13 extend to a side edge of the dielectric base board 11 so as to provide connecting terminals for connecting the transmission processing unit 8 and the reception processing unit 9 thereto via the filter circuits 17 and 18, respectively.

As shown in FIG. 3, a pair of leads 12c of the excitation loop antenna 12 are passed along the back side of the dielectric base board 11 so as to avoid the interference with the outer loop portion 13ab of the transmission/reception loop antenna 13. One of the leads 13c of the transmission/reception loop antenna 13 is also passed along the back side of the dielectric base board 11 so as to avoid the interference with the loop portion 12a of the excitation loop antenna 12 and the outer loop portion 13ab of the transmission/reception loop antenna 13. Additionally, a connecting lead 13d connecting the inner loop portion 13aa to the outer loop portion 13ab of the transmission/reception loop antenna 13 is passed along the back side of the dielectric base board 11 so as to avoid the interference with the loop portion 12a of the excitation loop antenna 12.

Figure 6:
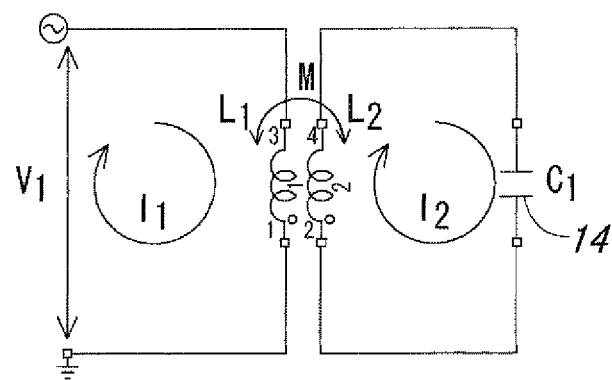
FIG. 6 is an equivalent circuit diagram of the transmission/reception antenna 4 given as a transformer circuit.
Figure 7:
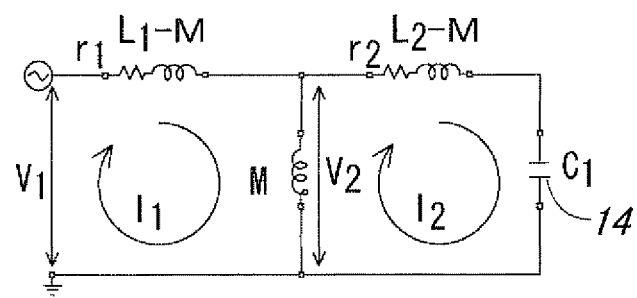
FIG. 7 is an equivalent circuit diagram of the transmission/reception antenna 4 given as a coil circuit.

The property of the transmission/reception antenna 4 is described in the following by using equivalent circuits thereof. FIG. 6 is a circuit diagram showing an equivalent circuit of the transmission/reception antenna 4 as a transformer circuit, and FIG. 7 is a circuit diagram showing an equivalent circuit of the transmission/reception antenna 4 as a coil circuit.

The inductance L1 of the excitation loop antenna 12 and the inductance L2 of the transmission/reception loop antenna 13 are electro-magnetically coupled as represented by a mutual inductance M. The mutual inductance M is related to the inductance L1 and the inductance L2 by the following equation.

$$M = K \times \sqrt{(L1 \times L2)} \qquad \text{(Eq. 1)}$$

where the coupling coefficient K may take a value as given by $0 \leq K \leq 1$. As can be seen from. Eq. 1, the greater the coupling coefficient K is, the greater the mutual inductance M gets.

When a primary current I1 is conducted through the excitation loop antenna 12, the resulting magnetic flux causes an induced voltage V2 across the open ends of the transmission/reception loop antenna 13 owing to the mutual inductance M. As the resonance capacitor 14 (C1) is connected across the open ends of the transmission/reception loop antenna 13, a secondary current I2 flows in the closed circuit consisting of the inductance L2 and the capacitance C1.

Figure 8:
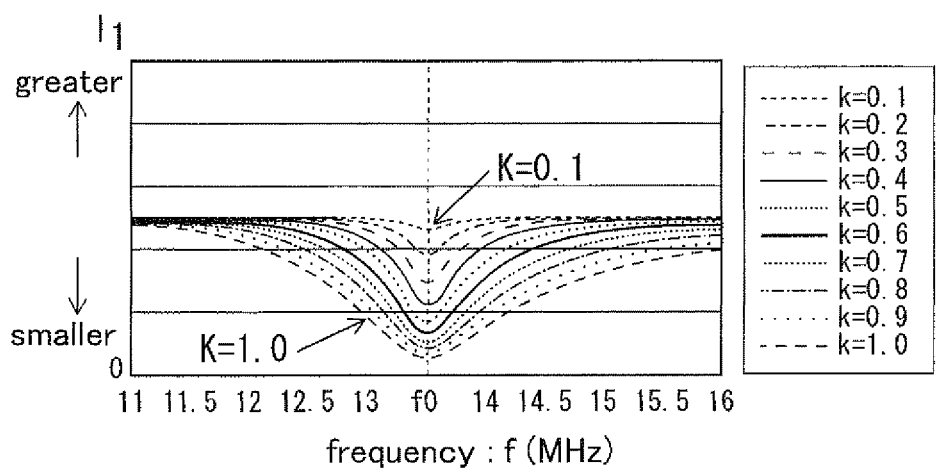
FIG. 8 is a graph showing the frequency properties of the primary current I1 flowing in the excitation loop antenna 12 for different values of the coupling coefficient K between the excitation loop antenna 12 and the transmission/reception loop antenna 13.
Figure 9:
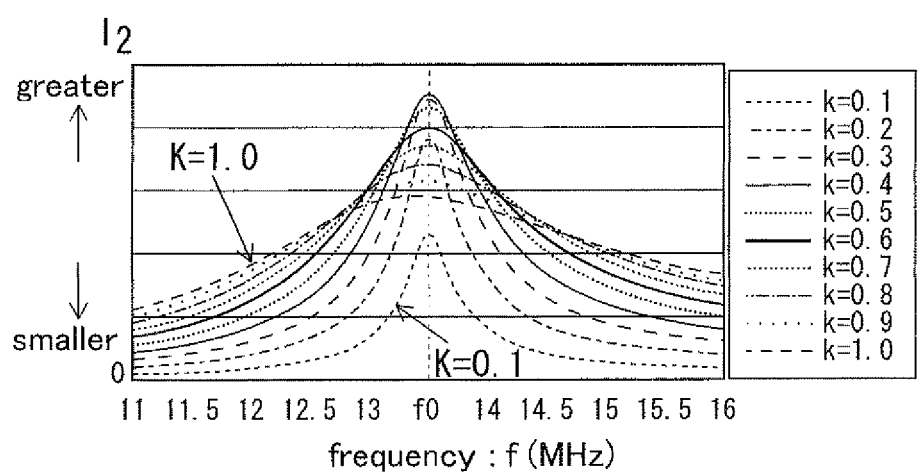
FIG. 9 is a graph showing the frequency properties of the secondary current I2 flowing in the transmission/reception loop antenna 13 for different values of the coupling coefficient K between the excitation loop antenna 12 and the transmission/reception loop antenna 13.

FIG. 8 is a graph showing the frequency properties of the primary current I1 flowing in the excitation loop antenna 12 for different values of the coupling coefficient K between the excitation loop antenna 12 and the transmission/reception loop antenna 13. FIG. 9 is a graph showing the frequency properties of the secondary current I2 flowing in the transmission/reception loop antenna 13 for different values of the coupling coefficient K between the excitation loop antenna 12 and the transmission/reception loop antenna 13.

As can be seen from FIG. 8, the primary current I1 takes a peak value (minimum value) at the resonant frequency f0 (which is 13.56 MHz in this embodiment), and this peak value progressively decreases as the coupling coefficient K is increased from 0.1 to 1.0 over the entire frequency range. In particular, even in regions remote from the resonant frequency f0, the primary current I1 significantly decreases with an increase in the coupling coefficient K.

As can be seen from FIG. 9, the secondary current I2 takes a peak value (maximum value) at the resonant frequency f0 (which is 13.56 MHz in this embodiment), and this peak value and the secondary current value in the adjacent frequency range progressively increases with an increase in the value of the coupling coefficient K from 0.1 to 0.4, but decreases when the coupling coefficient K is increased beyond 0.4. The value of the secondary current I2 in the frequency ranges remote from the resonant frequency f0 generally increases as the value of the coupling coefficient K is increased from 0.1 to 1.0. Therefore, it can be seen that the frequency range has expanded.

The magnetic flux (magnetic field strength) generated by the excitation loop antenna 12 and the transmission/reception loop antenna 13 is described in the following. The magnetic field strength H generated by current I conducted through a coil conductor is related to the inductance L of the coil conductor by the following equation.

$$H \propto L \times I \qquad \text{(Eq. 2)}$$

In other words, the magnetic field strength H is proportional to the product of the inductance L and the electric current I flowing through the coil conductor.

Therefore, at frequency f0, the magnetic field strength H1 produced by the primary current I1 conducted through the excitation loop antenna 12 is proportional to the product of the inductance L1 of the excitation loop antenna 12 and the primary current I1. Likewise, the magnetic field strength H2 produced by the secondary current I2 conducted through the transmission/reception loop antenna 13 is proportional to the product of the inductance L2 of the transmission/reception loop antenna 13 and the secondary current I2.

As the primary current I1 conducted through the excitation loop antenna 12 is opposite in direction to the secondary current I2 conducted through the transmission/reception loop antenna 13 as shown in FIG. 4, the magnetic flux produced by the excitation loop antenna 12 is opposite in direction to the magnetic flux produced by the transmission/reception loop antenna 13, and these two magnetic fluxes attenuate each other. The magnetic field strength H of the transmission/reception antenna 4 after taking into consideration this mutual attenuation can be given by subtracting the magnetic field strength H1 of the excitation loop antenna 12 from the magnetic flux H2 of the transmission/reception loop antenna 13. In other words, the magnetic flux generated by the conduction of electric current through the excitation loop antenna 12 reduces the magnetic flux generated by the conduction of electric current through the transmission/reception loop antenna 13.

In the present embodiment, an excessive attenuation of the magnetic flux of the transmission/reception loop antenna 13 is avoided by forming the excitation loop antenna 12 as consisting of a loop portion 12a of a single turn while the transmission/reception loop antenna 13 is formed as a loop portion 13a of a plurality of turns. Thereby, an adequate magnetic flux can be produced from the transmission/reception loop antenna 13 without excessively increasing the transmission power from the excitation loop antenna 12, and the power consumption can be controlled.

In the first embodiment, the transmission/reception loop antenna 13 includes four turns, but the number of turns can be selected appropriately. However, it is preferable that the inductance L1 of the excitation loop antenna 12 and the inductance L2 of the transmission/reception loop antenna 13 satisfy the condition that $L2 \geq 10 \times L1$.

Figure 10:
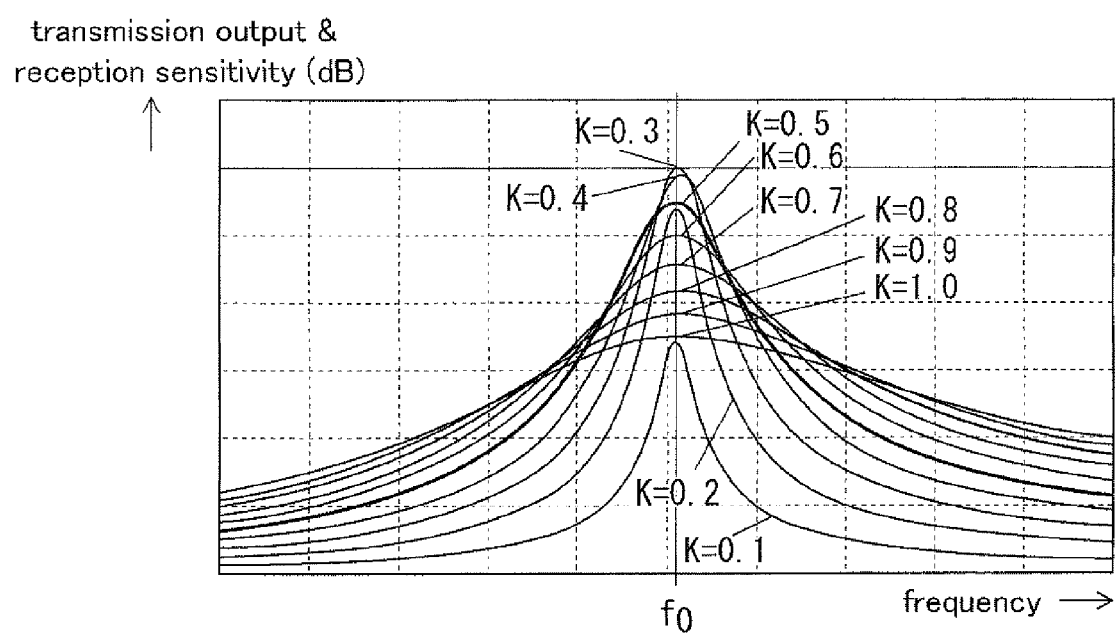
FIG. 10 is a graph showing the frequency properties of the transmission output and the reception sensitivity for different values of the coupling coefficient K between the excitation loop antenna 12 and the transmission/reception loop antenna 13.
Figure 11:
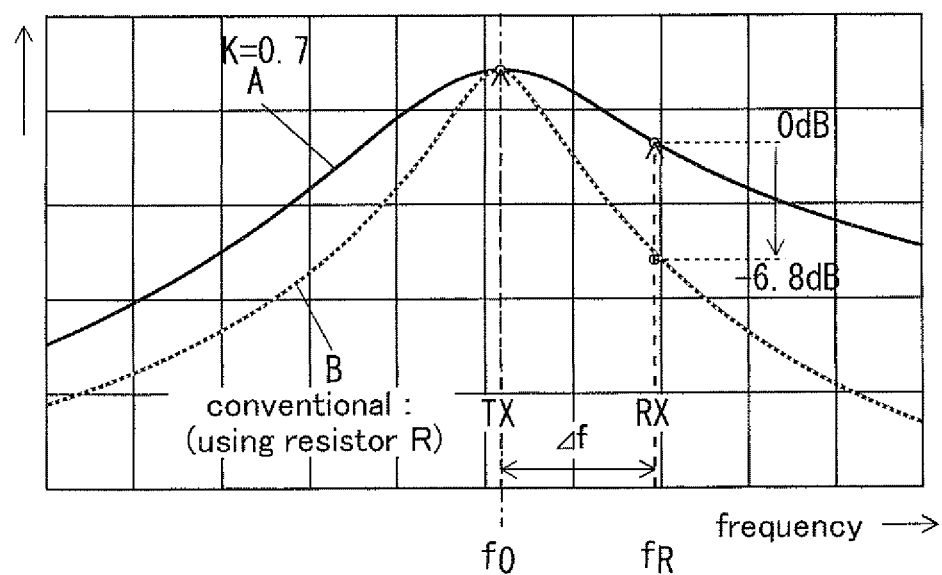
FIG. 11 shows the frequency property of the prior art when the coupling coefficient K=0.7, and the frequency property of a conventional arrangement using a resistor for expanding the frequency range.

FIG. 10 shows the frequency properties of the transmission output and the reception sensitivity for different values of the coupling coefficient K between the excitation loop antenna 12 and the transmission/reception loop antenna 13. Here, the transmission output and the reception sensitivity are substantially given by multiplying the inductance L2 of the transmission/reception loop antenna 13 to the secondary current I2 having the property as given in FIG. 9. FIG. 11 shows the frequency property of the present embodiment when the coupling coefficient K=0.7, and the frequency property of a conventional arrangement using a resistor R for expanding the frequency range.

As can be seen by comparing the present embodiment indicated by line A with the conventional arrangement indicated by line B in FIG. 11, the transmission output and reception sensitivity of the present embodiment are higher than those of the conventional arrangement, and demonstrate a broader frequency property than the conventional arrangement. In the first embodiment, by appropriately selecting the coupling coefficient K between the excitation loop antenna 12 and the transmission/reception loop antenna 13, the frequency property may be expanded, and the power consumption can be reduced as compared with the conventional arrangement because a resistor is not provided in the transmission/reception signal path of the transmission/reception antenna as opposed to the conventional arrangement.

Figure 12:
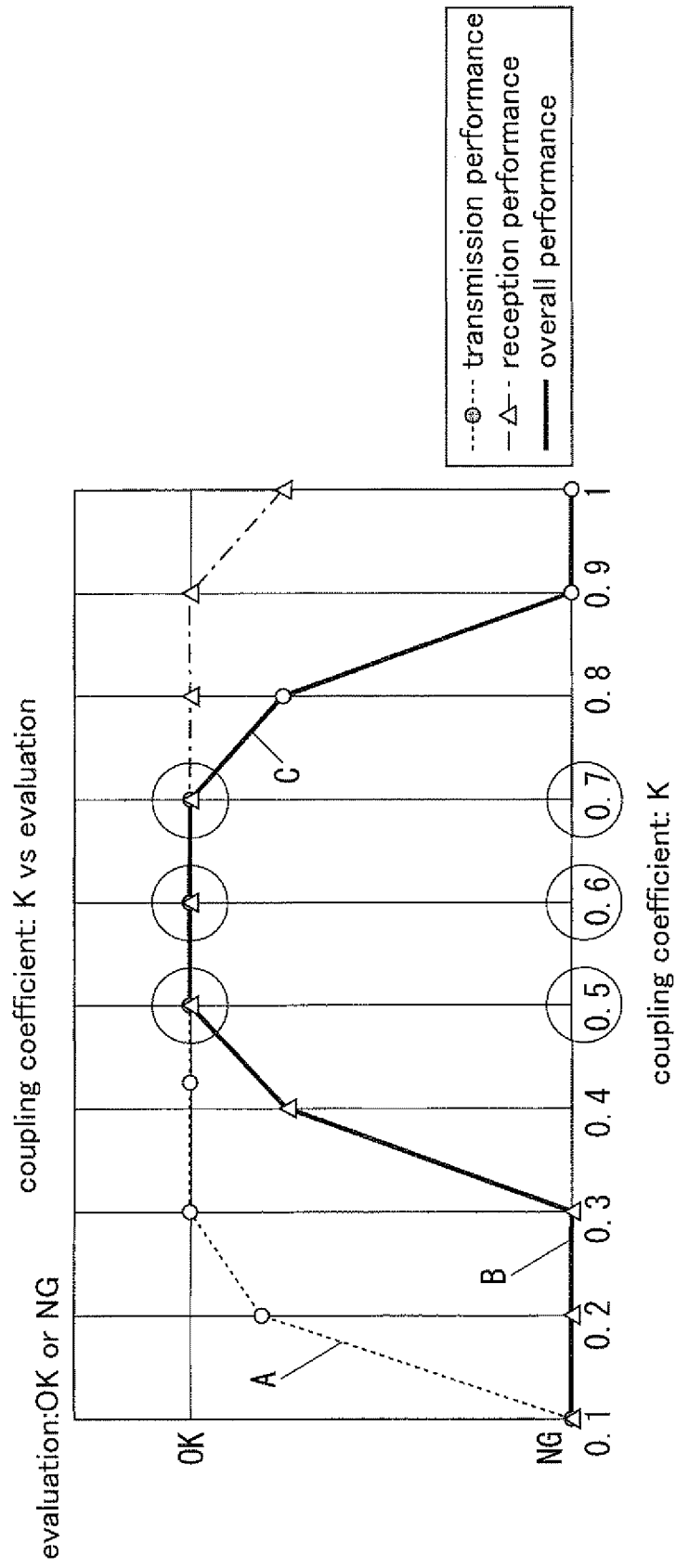
FIG. 12 is a diagram illustrating a method of evaluating the communication performance for different values of the coupling coefficient K between the excitation loop antenna 12 and the transmission/reception loop antenna 13.

The optimum value of the coupling coefficient K between the excitation loop antenna 12 and the transmission/reception loop antenna 13 is discussed in the following. FIG. 12 is a diagram illustrating a method of evaluating the communication performance for different values of the coupling coefficient K between the excitation loop antenna 12 and the transmission/reception loop antenna 13. In this diagram, by using the coupling coefficient K as a parameter, the transmission performance in transmitting a signal to the wireless communication medium 1 is indicated by line A, the reception performance in receiving a response signal from the wireless communication medium 1 is indicated by line B, and the overall performance combining both the transmission performance and the reception performance is indicated by line C.

The transmission performance (line A) is generally favorable in the range where the coupling coefficient K=0.3-0.7, and the reception performance (line B) is generally favorable in the range where the coupling coefficient K=0.5-0.9. Therefore, the overall performance that takes into account both the transmission performance and the reception performance is optimized in the range where the coupling coefficient K=0.5-0.7. In the first embodiment, as the coupling coefficient K is approximately 0.7, a favorable communication performance can be achieved.

As discussed above, in the first embodiment, owing to the foregoing structure, by selecting a relatively large value for the coupling coefficient K between the excitation loop antenna 12 and the transmission/reception loop antenna 13, the frequency property can be expanded.

Also, as the transmission/reception antenna 4 is formed by printing the excitation loop antenna 12 and the transmission/reception loop antenna 13 on the surface of the dielectric base board 11, the transmission/reception antenna 4 can be produced as a highly thin component. Therefore, the transmission/reception antenna 4 can be conveniently used in laptop personal computers, portable information terminals, portable telephones and other compact electronic devices.

Figure 13:
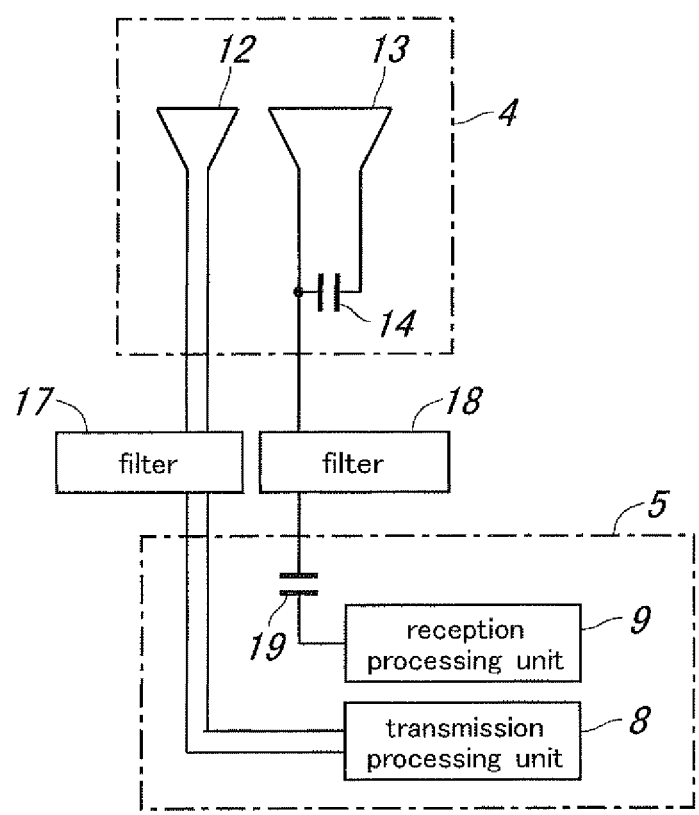
FIG. 13 is a simplified diagram of a transmission/reception device 2 of the first embodiment.

The coupling capacitor 19 provided on the path of the reception signal is described in the following with reference to FIG. 13 which is a schematic diagram of the transmission/reception device 2.

In the transmission/reception antenna 4, the excitation loop antenna 12 and the transmission/reception loop antenna 13 are in close proximity of each other so that the transmission signal that is transmitted from the excitation loop antenna 12 to the transmission/reception loop antenna 13 may be amplified. Therefore, the transmission signal that is to be transmitted from the excitation loop antenna 12 to the transmission/reception loop antenna 13 is inevitably passed directly to the reception processing unit 9 while the transmission/reception loop antenna 13 receives the signal from the wireless communication medium 1, and the received signal is forwarded to the reception processing unit 9. Therefore, even though the transmission/reception loop antenna 13 does not receive any supply of electric power, a considerable difference in signal level may be created between the transmission signal and the reception signal.

In particular, if the coupling coefficient K between the excitation loop antenna 12 and the transmission/reception loop antenna 13 is selected such that K=0.5-0.7, the transmission signal passed directly to the reception processing unit 9 may be stronger than the reception signal so that the transmission signal may interfere with the processing of the reception signal by the reception processing unit 9.

Therefore, in the first embodiment, the transmission/reception loop antenna 13 is connected to the reception processing unit 9 via a coupling capacitor 19. As a result, the intensity of the transmission signal that is directly passed to the reception processing unit 9 is reduced so that the interference between the transmission signal and the reception signal can be reduced, and the reception processing unit 9 is enabled to properly process the reception signal. The capacitance of the coupling capacitor 19 may be selected at an appropriate value (such as 3 pF) which provides an adequately high impedance for the transmission signal by taking into account the frequencies of the transmission signal and the reception signal.

Embodiment 2

Figure 14:
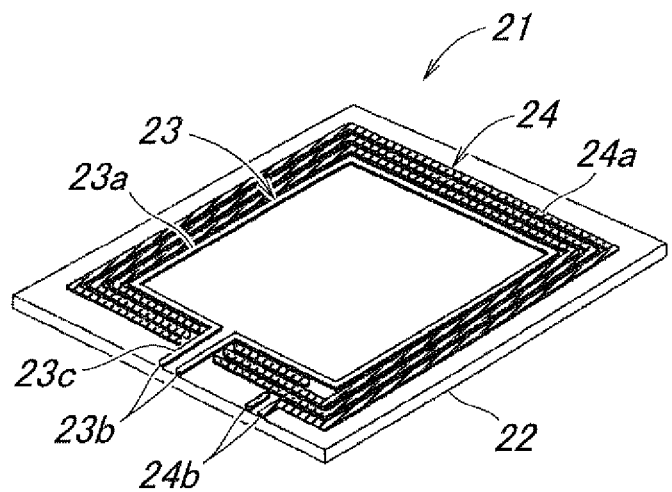
FIG. 14 is a perspective view showing a transmission/reception antenna 21 used in a second embodiment of the present invention.
Figure 15:
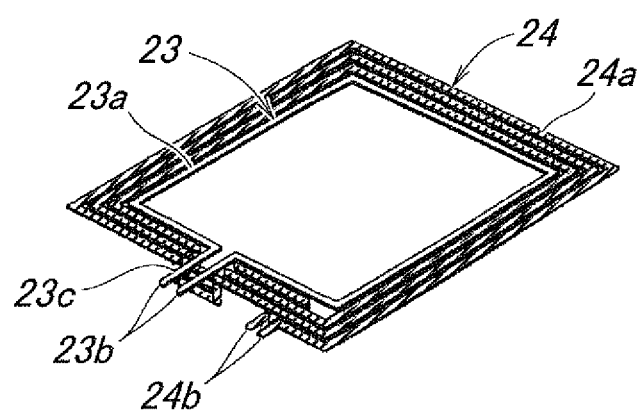
FIG. 15 is a perspective view of an essential part of the transmission/reception antenna 21.
Figure 16:
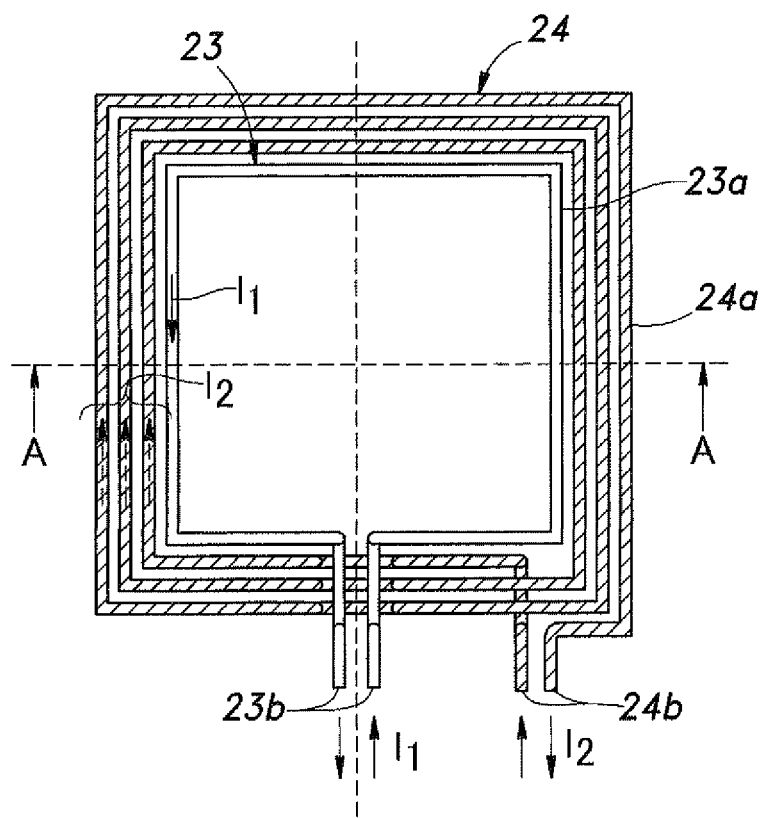
FIG. 16 is a plan view of an essential part of the transmission/reception antenna 21.
Figure 17:
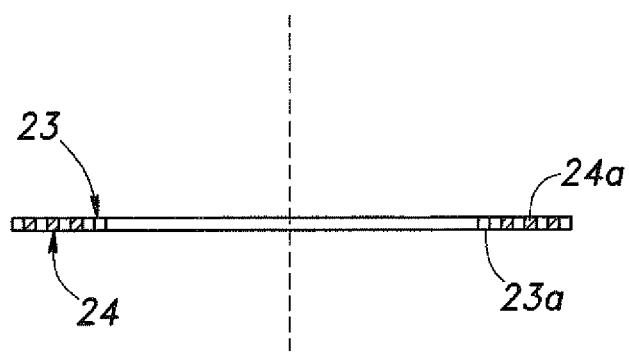
FIG. 17 is a sectional view of an essential part of the transmission/reception antenna 21 taken along line A-A of FIG. 16.

FIG. 14 is a perspective view of the transmission/reception antenna 21 according to a second embodiment of the present invention. FIG. 15 is a perspective view of an essential part of the transmission/reception antenna 21. FIG. 16 is a plan view of an essential part of the transmission/reception antenna 21. FIG. 17 is a sectional view of an essential part of the transmission/reception antenna 21 taken along line A-A of FIG. 16. In FIGS. 15 to 17, the dielectric base board 22 is omitted from illustration to clearly show the structures of the excitation loop antenna 23 and the transmission/reception loop antenna 24, and the relationship between them.

As shown in FIGS. 14 to 17, in the second embodiment also, the excitation loop antenna 23 and the transmission/reception loop antenna 24 are placed in close proximity of each other without touching each other on the dielectric base board 22. The excitation loop antenna 23 and the transmission/reception loop antenna 24 are formed on the dielectric base board 22 by printing. A resonance capacitor similar to the resonance capacitor 14 shown in FIG. 2 is connected across the two ends of the transmission/reception loop antenna 24 although not shown in the drawings.

In the second embodiment also, the excitation loop antenna 23 includes a loop portion 23*a* of a single turn, and the transmission/reception loop antenna 24 includes a loop portion 24*a* of a plurality of turns. In particular, the loop portion 23*a* of the excitation loop antenna 23 is placed inside the loop portion 24*a* of the transmission/reception loop antenna 24. Owing to this arrangement, the coupling coefficient K between the excitation loop antenna 23 and the transmission/reception loop antenna 24 is approximately 0.5 so that a favorable communication performance can be achieved as can be appreciated from the diagram of FIG. 12.

The terminal ends (connecting terminals) 23*b* of the excitation loop antenna 23 and the terminal ends (connecting terminals) 24*b* of the transmission/reception loop antenna 24 are extended to a side edge of the dielectric base board 22, and are connected to the transmission processing unit S and the reception processing unit 9 via a respective filter circuit 17, 18 similarly as in the first embodiment illustrated in FIG. 1. As shown in FIG. 15, the loop portion 24*a* of the transmission/reception loop antenna 24 is partly passed along the back side of the dielectric base board 22 so as not to interfere with the leads 23*c* of the excitation loop antenna 23.

As can be appreciated from the foregoing description, the coupling coefficient K between the excitation loop antenna 23 and the transmission/reception loop antenna 24 can be selected at a relatively high value so that the frequency property can be expanded. As the excitation loop antenna 23 and the transmission/reception loop antenna 24 of the transmission/reception antenna 21 can be printed on the surface of the dielectric circuit board, the overall thickness of transmission/reception antenna 21 can be minimized.

Embodiment 3

Figure 18:
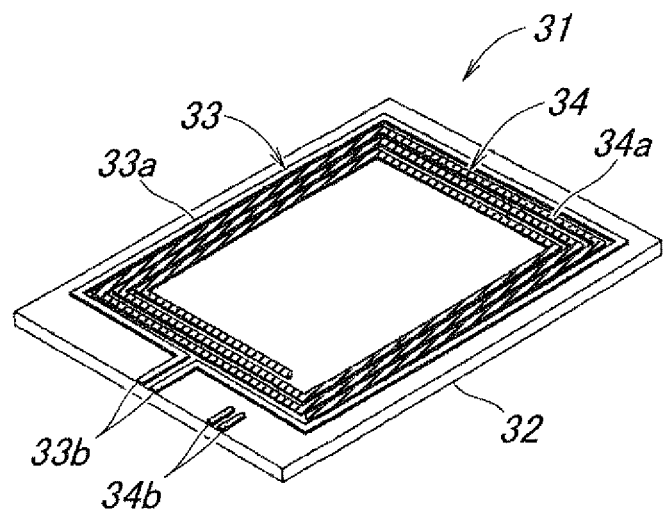
FIG. 18 is a perspective view showing a transmission/reception antenna 41 used in a third embodiment of the present invention.
Figure 19:
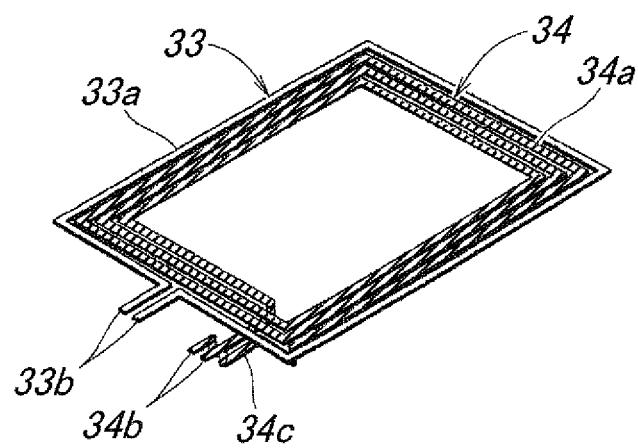
FIG. 19 is a perspective view of an essential part of the transmission/reception antenna 41.
Figure 20:
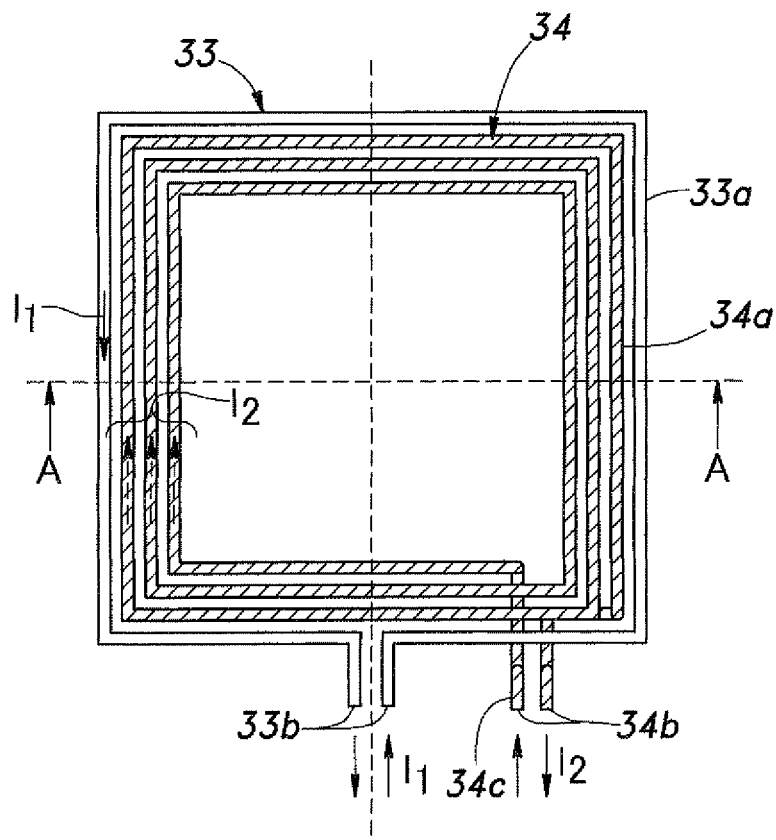
FIG. 20 is a plan view of an essential part of the transmission/reception antenna 41.
Figure 21:
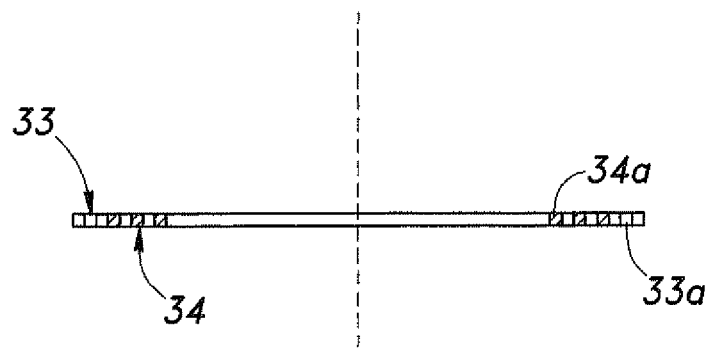
FIG. 21 is a sectional view of an essential part of the transmission/reception antenna 41 taken along line A-A of FIG. 20.

FIG. 18 is a perspective view showing a transmission/reception antenna 41 used in a third embodiment of the present invention. FIG. 19 is a perspective view of an essential part of the transmission/reception antenna 41. FIG. 20 is a plan view of an essential part of the transmission/reception antenna 41. FIG. 21 is a sectional view of an essential part of the transmission/reception antenna 41 taken along line A-A of FIG. 20. In FIGS. 19 to 21, the dielectric base board 32 is omitted from illustration to clearly show the structures of the excitation loop antenna 33 and the transmission/reception loop antenna 34, and the relationship between them As shown in FIGS. 18 to 21, in the third embodiment also, the excitation loop antenna 33 and the transmission/reception loop antenna 34 are placed in close proximity of each other without touching each other on the dielectric base board 32. The excitation loop antenna 33 and the transmission/reception loop antenna 34 are formed on the dielectric base board 32 by printing. A resonance capacitor similar to the resonance capacitor 14 shown in FIG. 2 is connected across the two ends of the transmission/reception loop antenna 24 although not shown in the drawings.

In the third embodiment also, the excitation loop antenna 33 includes a loop portion 33*a* of a single turn, and the transmission/reception loop antenna 34 includes a loop portion 34*a* of a plurality of turns. In particular, the loop portion 33*a* of the excitation loop antenna 33 is placed outside the loop portion 34*a* of the transmission/reception loop antenna 34. Owing to this arrangement, the coupling coefficient K between the excitation loop antenna 23 and the transmission/reception loop antenna 24 is approximately 0.5 so that a favorable communication performance can be achieved as can be appreciated from the diagram of FIG. 12.

The terminal ends (connecting terminals) 33*b* of the excitation loop antenna 33 and the terminal ends (connecting terminals) 34*b* of the transmission/reception loop antenna 34 are extended to a side edge of the dielectric base board 32, and are connected to the transmission processing unit 8 and the reception processing unit 9 via a respective filter circuit 17, 18 similarly as in the first embodiment illustrated in FIG. 1. As shown in FIG. 19, the leads 34c of the transmission/reception loop antenna 34 are partly passed along the back side of the dielectric base board 32 so as not to interfere with the loop portion 33a of the excitation loop antenna 33 and the loop portion 33a of the excitation loop antenna 33.

As can be appreciated from the foregoing description, the coupling coefficient K between the excitation loop antenna 33 and the transmission/reception loop antenna 34 can be selected at a relatively high value so that the frequency property can be expanded. As the excitation loop antenna 33 and the transmission/reception loop antenna 34 of the transmission/reception antenna 31 can be printed on the surface of the dielectric circuit board, the overall thickness of the transmission/reception antenna 31 can be minimized.

The excitation loop antenna 12, 23, 33 and the transmission/reception loop antenna 13, 24, 34 were rectangular in shape in the first to third embodiments, but the present invention is not limited by these embodiments, and the excitation loop antenna and the transmission/reception loop antenna may also have circular, elliptic, track and other shapes.

In the transmission/reception device 2 of the first embodiment, the transmission/reception loop antenna 13 was connected to the reception processing unit 9 via the coupling capacitor 19 as shown in FIG. 1. In the transmission/reception devices of the second and third embodiments also, the transmission/reception loop antenna 24, 34 may be connected to the reception processing unit 9 via a coupling capacitor in a similar fashion.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A transmission/reception device, comprising:
a transmission/reception antenna;
a transmitter structured to forward a transmission signal to the transmission/reception antenna;
a receiver structured to receive a reception signal from the transmission/reception antenna and
a controller structured to control the transmitter and the receiver;
wherein the transmission/reception antenna comprises:
a dielectric base board;
an excitation loop antenna disposed on the dielectric base board;
a transmission/reception loop antenna disposed on the dielectric base board in close proximity of but not in contact with the excitation loop antenna; and
a resonance capacitor connected between two ends of the transmission/reception loop antenna;
wherein a coupling capacitor is connected to one of the two ends of the transmission/reception loop antenna, and
wherein the excitation loop antenna is connected to the transmitter and the transmission/reception loop antenna is connected to the receiver via the coupling capacitor.

2. The transmission/reception device according to claim 1, wherein the excitation loop antenna comprises a loop portion of a single turn, and the transmission/reception loop antenna comprises a loop portion of a plurality of turns.

3. The transmission/reception device according to claim 1, wherein a coupling coefficient K between the excitation loop antenna and the transmission/reception loop antenna is in a rage of 0.5 to 0.7.

4. The transmission/reception device according to claim 1, wherein the transmission/reception loop antenna comprises an inner loop portion and an outer loop portion located outside of the inner loop portion, and the excitation loop antenna is located between the inner loop portion and the outer loop portion of the transmission/reception loop antenna.

5. The transmission/reception device according to claim 1, wherein the excitation loop antenna is located inside of the transmission/reception loop antenna.

6. The transmission/reception device according to claim 1, wherein the excitation loop antenna is located outside of the transmission/reception loop antenna.

7. A transmission/reception device according to claim 1, further comprising:
a transmitter connecting terminal connected to the excitation loop antenna; and
a receptor connecting terminal connected to the transmission/reception loop antenna,
wherein the transmitter connecting terminal connected to the excitation loop antenna is connected to the transmitter, and the receptor connecting terminal is connected to the receiver via the coupling capacitor.

8. The transmission/reception device according to claim 7, wherein the excitation loop antenna comprises a loop portion of a single turn, and the transmission/reception loop antenna comprises a loop portion of a plurality of turns.

9. The transmission/reception device according to claim 7, wherein the transmission/reception loop antenna comprises an inner loop portion and an outer loop portion located outside of the inner loop portion, and the excitation loop antenna is located between the inner loop portion and the outer loop portion of the transmission/reception loop antenna; and
wherein an end of the inner loop portion is connected to an end of the outer loop portion, the other end of the inner loop portion is connected to an end of a resonance capacitor, and the other end of the outer loop portion is connected to the other end of the resonance capacitor.

10. The transmission/reception device according to claim 7, wherein the excitation loop antenna is located inside of the transmission/reception loop antenna.

11. The transmission/reception device according to claim 7, wherein the excitation loop antenna is located outside of the transmission/reception loop antenna.

* * * * *